(12) United States Patent
Kinoshita

(10) Patent No.: US 9,824,813 B2
(45) Date of Patent: Nov. 21, 2017

(54) REACTOR AND POWER SUPPLY DEVICE EMPLOYING THE SAME

(75) Inventor: Masahiro Kinoshita, Chuo-ku (JP)

(73) Assignee: TOSHIBA MITSUBISHI-ELECTRIC INDUSTRIAL SYSTEMS CORPORATION, Tokyo (JP)

(*) Notice: Subject to any disclaimer, the term of this patent is extended or adjusted under 35 U.S.C. 154(b) by 530 days.

(21) Appl. No.: 14/371,092

(22) PCT Filed: Mar. 13, 2012

(86) PCT No.: PCT/JP2012/056367
§ 371 (c)(1),
(2), (4) Date: Jul. 8, 2014

(87) PCT Pub. No.: WO2013/136428
PCT Pub. Date: Sep. 19, 2013

(65) Prior Publication Data
US 2015/0022000 A1    Jan. 22, 2015

(51) Int. Cl.
*H01F 27/29* (2006.01)
*H01F 27/24* (2006.01)
*H01F 37/00* (2006.01)
*H02M 3/158* (2006.01)

(52) U.S. Cl.
CPC .......... *H01F 27/29* (2013.01); *H01F 27/24* (2013.01); *H01F 37/00* (2013.01); *H02M 3/1584* (2013.01); *Y10T 307/50* (2015.04); *Y10T 307/549* (2015.04)

(58) Field of Classification Search
CPC .......... H01F 27/29; H01F 27/24; H01F 37/00; H02M 3/1584; Y10T 307/50; Y10T 307/549
See application file for complete search history.

(56) References Cited

U.S. PATENT DOCUMENTS

| 5,204,809 A | 4/1993 | Andresen |
| 6,362,986 B1 * | 3/2002 | Schultz ................. H02M 3/158 363/132 |
| 7,132,812 B1 * | 11/2006 | Wu .......................... H01F 27/28 318/448 |

(Continued)

FOREIGN PATENT DOCUMENTS

| JP | 52 85448 | 7/1977 |
| JP | 09 215322 | 8/1997 |

(Continued)

OTHER PUBLICATIONS

Office Action dated Sep. 29, 2015 in Japanese Patent Application No. 2014-504501 (with English language translation).

(Continued)

*Primary Examiner* — Jared Fureman
*Assistant Examiner* — James Evans
(74) *Attorney, Agent, or Firm* — Oblon, McClelland, Maier & Neustadt, L.L.P.

(57) ABSTRACT

A reactor includes an annular iron core and four coils separately wound around the iron core. The four coils have first electrodes connected to output terminals of four choppers, respectively, and second electrodes each connected to a load. Therefore, the four choppers can be connected in parallel to the load by one reactor.

19 Claims, 10 Drawing Sheets

(56) References Cited

U.S. PATENT DOCUMENTS

| | | | | |
|---|---|---|---|---|
| 8,179,066 | B2* | 5/2012 | Terorde | H02M 7/49 318/400.2 |
| 8,508,957 | B2* | 8/2013 | Sato | H02J 9/062 363/131 |
| 2007/0035282 | A1* | 2/2007 | Petersen | H02M 1/4208 323/282 |
| 2007/0247123 | A1* | 10/2007 | Bocchiola | H02M 3/1584 323/222 |
| 2008/0055949 | A1* | 3/2008 | Noda | H02J 7/35 363/95 |

FOREIGN PATENT DOCUMENTS

| | | |
|---|---|---|
| JP | 2005 65384 | 3/2005 |
| JP | 2006 271102 | 10/2006 |
| JP | 2010 62409 | 3/2010 |
| JP | 2011 223667 | 11/2011 |
| JP | 2012 010507 | 1/2012 |

OTHER PUBLICATIONS

International Search Report dated Jun. 19, 2012 in PCT/JP12/056367 filed Mar. 13, 2012.
Pit-Leong Wong, Performance Improvements of Interleaving VRMs with Coupling Inductors, IEEE Transactions on Power Electronics, vol. 16, No. 4, IEEE, Jul. 2001, pp. 499-507.

* cited by examiner

REACTOR AND POWER SUPPLY DEVICE EMPLOYING THE SAME

TECHNICAL FIELD

The present invention relates to a reactor and a power supply device employing the reactor, and particularly to a reactor by which a plurality of power supplies are connected in parallel to a load, and the power supply devices employing the reactor.

BACKGROUND ART

Even when a load capacity is greater than the output of a chopper, the load can be operated if a plurality of choppers are connected in parallel to the load. In this case, the load current needs to be equally shared among the plurality of choppers. Furthermore, it is necessary to connect a reactor between each chopper and the load, thereby suppressing influences of the timing of switching between choppers, and the difference between the output impedances (for example, see Japanese Patent Laying-Open No. 09-215322 (PTD 1) and Japanese Patent Laying-Open No. 2006-271102 (PTD 2)).

CITATION LIST

Patent Document

PTD 1: Japanese Patent Laying-Open No. 09-215322
PTD 2: Japanese Patent Laying-Open No. 2006-271102

SUMMARY OF INVENTION

Technical Problem

However, since a reactor has been conventionally provided for each chopper, the same number of reactors as choppers needs to be provided, which caused a problem that the device is increased in size and cost (see FIGS. 5 and 12).

Therefore, a main object of the present invention is to provide a small-sized and inexpensive reactor and a power supply device employing this reactor.

Solution to Problem

A reactor according to the present invention is a reactor by which N (N is an integer of 2 or more) power supplies are connected in parallel to a load, and including an annular iron core, and N coils separately wound around the iron core. The N coils have first electrodes connected to output terminals of the N power supplies, respectively, and second electrodes each connected to the load.

Preferably, the reactor further includes N first terminals connected to the first electrodes of the N coils, respectively, and a second terminal connected to the second electrodes of the N coils. The N first terminals are connected to the output terminals of the N power supplies, respectively, and the second terminal is connected to the load.

Furthermore, another reactor according to the present invention is a reactor by which N (N is an integer of 2 or more) power supplies are connected in parallel to a load, and including an annular iron core, and N first coils and N second coils separately wound around the iron core. The N first coils have first electrodes connected to first output terminals of the N power supplies, respectively, and second electrodes each connected to one terminal of the load. The N second coils have first electrodes connected to second output terminals of the N power supplies, respectively, and second electrodes each connected to the other terminal of the load. The first coil and the second coil connected to the same power supply form a normal mode coil.

Preferably, the reactor further includes N first terminals connected to the first electrodes of the N first coils, respectively, N second terminals connected to the first electrodes of the N second coils, respectively, a third terminal connected to the second electrodes of the N first coils, and a fourth terminal connected to the second electrodes of the N second coils. The N first terminals are connected to the first output terminals of the N power supplies, respectively. The N second terminals are connected to the second output terminals of the N power supplies, respectively. The third terminal is connected to one terminal of the load. The fourth terminal is connected to the other terminal of the load.

Further preferably, the iron core includes first and second leg portions, and a yoke portion magnetically coupling the first and second leg portions. The N first coils are separately wound around the first leg portion, and the N second coils are separately wound around the second leg portion. The first coil and the second coil forming the normal mode coil are arranged adjacent to each other.

Furthermore, a power supply device according to the present invention includes the above-described reactor and the N power supplies.

Preferably, each of the N power supplies is a chopper converting a first DC (direct-current) voltage into a second DC voltage.

Further preferably, each of the N power supplies is an inverter converting a DC voltage into an AC (alternating-current) voltage.

Further preferably, each of the N power supplies is a converter converting an AC voltage into a DC voltage.

Advantageous Effects of Invention

According to a reactor and a power supply device of the present invention, N coils are separately wound around an annular iron core, and the N coils have first electrodes connected to output terminals of N power supplies, respectively, and second electrodes each connected to a load. Therefore, since it is sufficient to provide one reactor for a plurality of power supplies, the device can be decreased in size and cost.

DESCRIPTION OF EMBODIMENTS

First Embodiment

Figure 1:
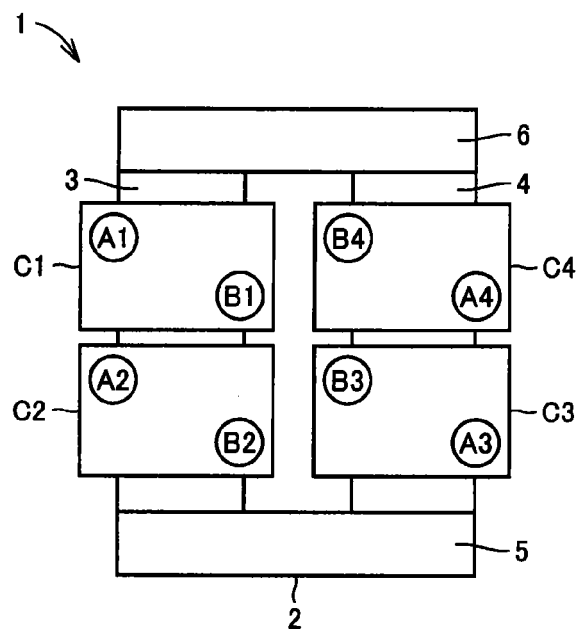
FIG. 1 is a diagram showing a main part of a reactor according to the first embodiment of the present invention.

A reactor 1 according to the first embodiment of the present application includes an annular iron core 2 in a quadrangular shape and a plurality of (four in FIG. 1) coils C1 to C4, as shown in FIG. 1. Iron core 2 includes two leg portions 3 and 4, and two yoke portions 5 and 6. Two leg portions 3 and 4 are arranged at a prescribed distance from and in parallel to each other, and vertically arranged on yoke portion 5. Leg portions 3 and 4 each have a lower end joined to yoke portion 5 and an upper end to which yoke portion 6 is joined. Leg portions 3 and 4 are magnetically coupled by yoke portions 5 and 6. Leg portions 3, 4 and yoke portions 5, 6 form an annular magnetic path in a quadrangular shape.

Coils C1 to C4 are arranged in the circumferential direction of annular iron core 2 (in the leftward winding direction in FIG. 1), and separately wound around iron core 2. Coils C1 to C4 are the same components, each of which is formed by winding the same conductive wire in the same winding direction (for example, in the rightward winding direction) by the same number of winding times. In other words, coil C1 is wound around an upper portion of leg portion 3 while coil C2 is wound around a lower portion of leg portion 3. Furthermore, coil C3 is wound around a lower portion of leg portion 4 while coil C4 is wound around an upper portion of leg portion 4.

As seen from above leg portion 3, each of coils C1 and C2 is wound in a prescribed winding direction (for example, in the rightward winding direction). As seen from below leg portion 4, each of coils C3 and C4 is wound in a prescribed winding direction (in this case, in the rightward winding direction). Coils C1 to C4 are provided at their starting ends with first electrodes A1 to A4, respectively, and at their terminal ends with second electrodes B1 to B4, respectively. In this reactor 1, the degree of electromagnetic coupling among coils C1 to C4 is relatively low, thereby causing an increase in a leakage inductance.

Figure 2:
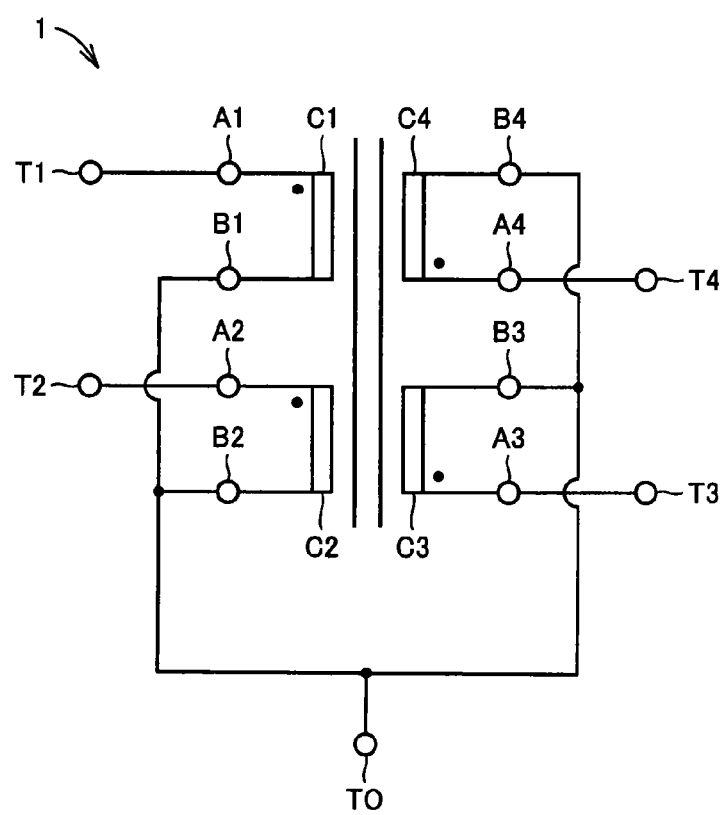
FIG. 2 is a circuit diagram showing the configuration of the reactor shown in FIG. 1.

FIG. 2 is a circuit diagram showing the configuration of reactor 1. In FIG. 2, reactor 1 includes four input terminals T1 to T4 and one output terminal TO, in addition to iron core 2 and coils C1 to C4. First electrodes A1 to A4 of coils C1 to C4 are connected to input terminals T1 to T4, respectively, while second electrodes B1 to B4 each are connected to output terminal TO. Since the starting ends (first electrodes A1 to A4) of coils C1 to C4 have the same polarity, each of the starting ends of coils C1 to C4 is indicated by a black dot mark in FIG. 2.

Figure 3:
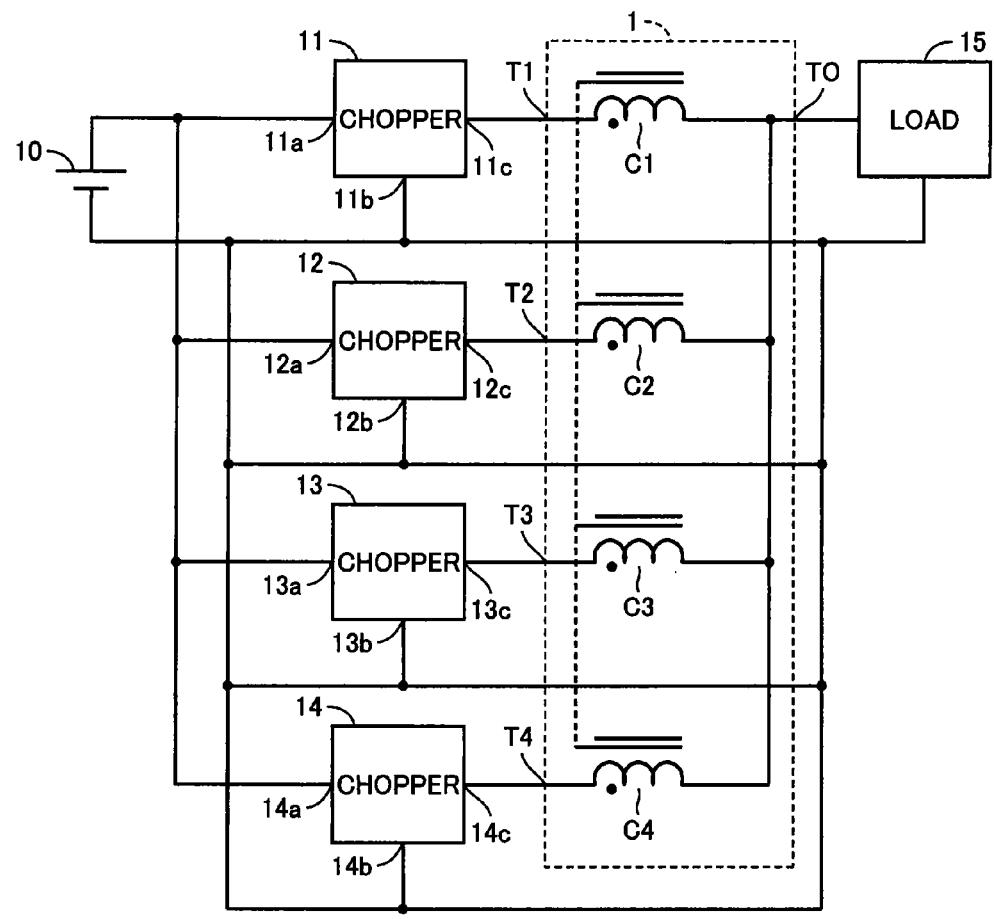
FIG. 3 is a circuit block diagram showing the configuration of a power supply device employing the reactor shown in FIG. 2.

FIG. 3 is a circuit block diagram showing the configuration of a power supply device including reactor 1. In FIG. 3, the power supply device includes a DC power supply 10, four choppers 11 to 14, and reactor 1. Each of power supply terminals 11a to 14a of choppers 11 to 14 is connected to a positive electrode of DC power supply 10. Each of reference voltage terminals 11b to 14b of choppers 11 to 14 is connected to a negative electrode of DC power supply 10. Output terminals 11c to 14c of choppers 11 to 14 are connected to input terminals T1 to T4, respectively, of reactor 1. Output terminal TO of reactor 1 is connected to one terminal of load 15. The other terminal of load 15 is connected to the negative electrode of DC power supply 10. The negative electrode of DC power supply 10 receives a reference voltage (for example, a ground voltage).

Each of choppers 11 to 14 receives a DC voltage V1 from DC power supply 10, converts the DC voltage V1 into a prescribed DC voltage V2, and supplies the converted DC voltage to load 15. Choppers 11 to 14 are controlled such that the current flowing through load 15 is equally shared among choppers 11 to 14.

Figure 4:
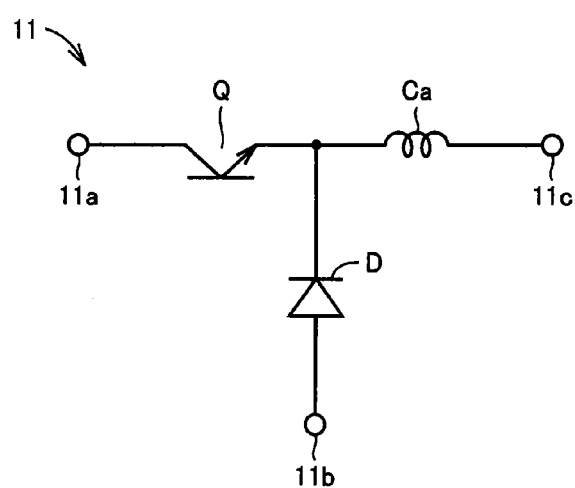
FIG. 4 is a circuit diagram showing the configuration of a chopper shown in FIG. 3.

FIG. 4 is a circuit diagram showing the configuration of chopper 11. In FIG. 4, chopper 11 includes a transistor Q, a diode D and a coil Ca. Transistor Q has a collector connected to an input terminal 11a, and an emitter connected to output terminal 11c through coil Ca. Diode D has an anode connected to a reference voltage terminal 11b, and a cathode connected to the emitter of transistor Q.

When transistor Q is turned on, a current flows from the positive electrode of DC power supply 10 through transistor Q, coils Ca and C1, and load 15 into the negative electrode of DC power supply 10, and electromagnetic energy is stored in coils Ca and C1. When transistor Q is turned off, a current flows through the path of coils Ca and C1, load 15 and diode D by means of electromagnetic energy stored in coils Ca and C1.

Transistor Q is turned on and off in a prescribed cycle. If the ON time of transistor Q in one cycle is increased, voltage V2 to be applied to load 15 rises. In contrast, if the ON time of transistor Q in one cycle is decreased, voltage V2 to be applied to load 15 falls. Therefore, by adjusting the ON time of transistor Q, output voltage V1 of DC power supply 10 can be converted into a desired DC voltage V2, which then can be supplied to load 15.

Each of other choppers 12 to 14 is also identical in configuration to chopper 11. By finely adjusting the ON times of transistors Q of choppers 11 to 14 separately, the load current can be equally shared among choppers 11 to 14.

In this first embodiment, a plurality of coils C1 to C4 are separately wound around iron core 2, first electrodes A1 to A4 of coils C1 to C4 are connected to output terminals 11c to 14c of a plurality of choppers 11 to 14, respectively, and second electrodes B1 to B4 of coils C1 to C4 each are connected to load 15. Accordingly, the plurality of choppers 11 to 14 can be connected in parallel to load 15 by one reactor 1, so that the device can be decreased in size and cost.

In addition, although each of choppers 11 to 14 is configured to include coil Ca in the first embodiment, coil Ca may be omitted. In this case, coils C1 to C4 additionally serve as coils Ca of choppers 11 to 14, respectively.

Furthermore, although DC power supply 10 and choppers 11 to 14 are provided in this first embodiment, the configuration is not limited thereto, but each of choppers 11 to 14 may be replaced with an inverter converting a DC voltage into an AC voltage. Furthermore, DC power supply 10 may be replaced with an AC power supply, and each of choppers 11 to 14 may be replaced with a converter converting an AC voltage into a DC voltage.

Furthermore, three reactors 1 corresponding to three phases, respectively, may be employed, and a plurality of inverters may be connected in parallel for each phase by reactor 1.

Furthermore, although four coils C1 to C4 are wound around one iron core 2 in this first embodiment, two, three or five or more coils may be wound around one iron core while two, three or five or more choppers 11 may be connected in parallel to load 15. In other words, N (N is an integer of 2 or more) coils may be wound around one iron core while N choppers 11 may be connected in parallel to load 15.

Figure 5:
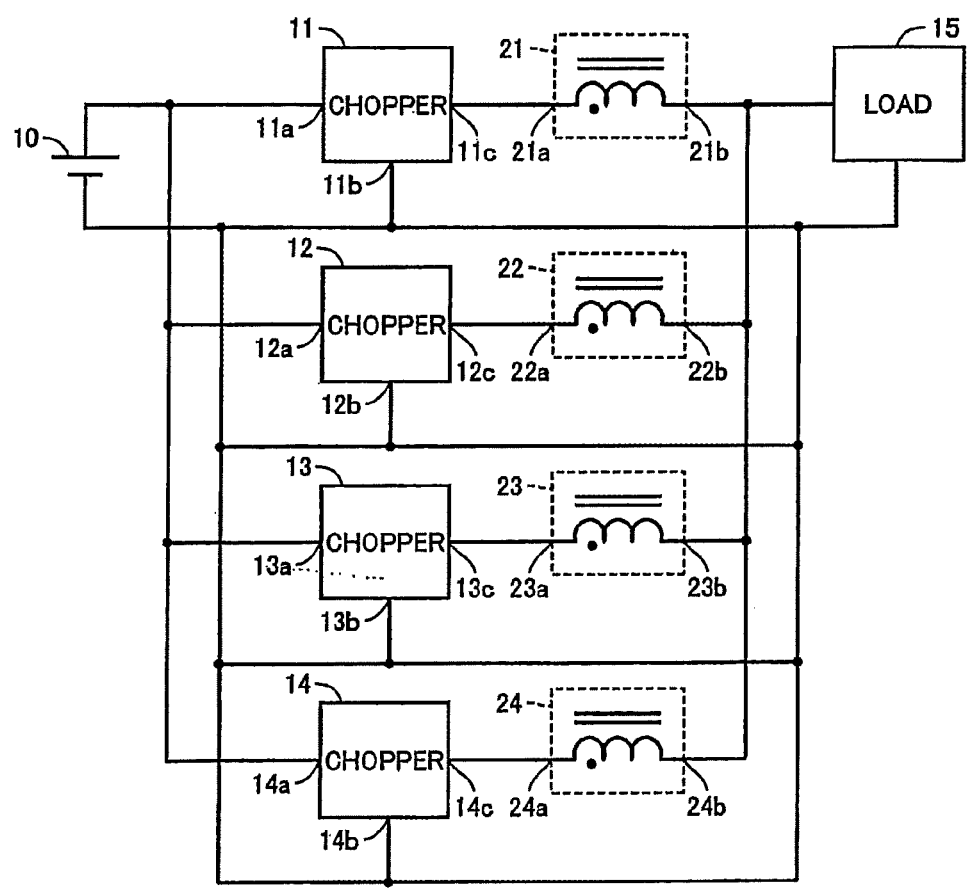
FIG. 5 is a circuit block diagram showing the configuration of a power supply device as a comparative example of the first embodiment.

FIG. 5 is a circuit block diagram showing the configuration of a power supply device as a comparative example of the first embodiment, which is a diagram compared with FIG. 3. Referring to FIG. 5, the difference between this power supply device and the power supply device in FIG. 3 is that reactor 1 is replaced with four reactors 21 to 24. First terminals 21a to 24a of reactors 21 to 24 are connected to output terminals 11c to 14c of choppers 11 to 14, respectively. Second terminals 21b to 24b of reactors 21 to 24 each are connected to one terminal of load 15.

Figure 6:
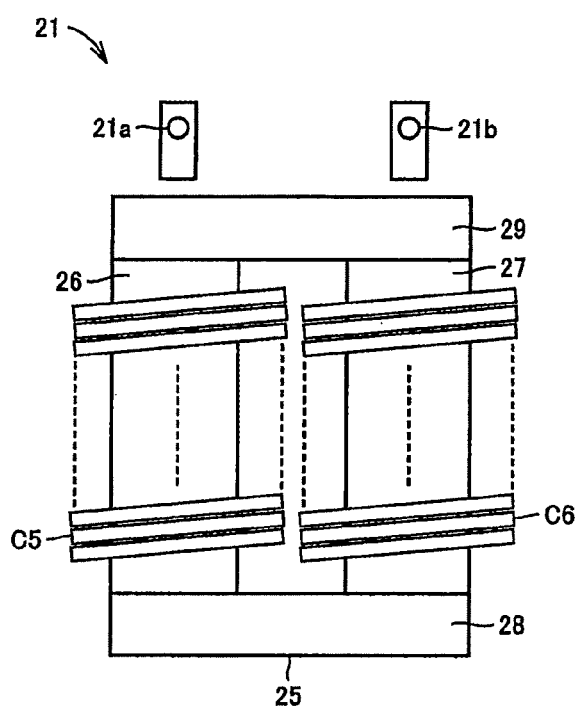
FIG. 6 is a diagram showing the configuration of a reactor shown in FIG. 5.
Figure 7:
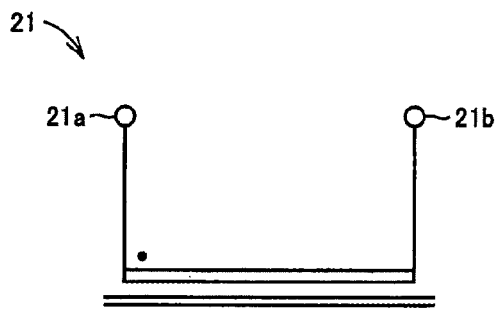
FIG. 7 is a circuit diagram showing the reactor shown in FIG. 6.

FIG. 6 is a diagram showing the configuration of a reactor 21, and FIG. 7 is a circuit diagram showing reactor 21. In FIGS. 6 and 7, reactor 21 includes an annular iron core 25 in a quadrangular shape, two coils C5 and C6, a first terminal 21a, and a second terminal 21b. Iron core 25 includes two leg portions 26, 27 and two yoke portions 28, 29. Leg portions 26 and 27 are magnetically coupled by yoke portions 28 and 29. Leg portions 26, 27 and yoke portions 28, 29 form an annular magnetic path in a quadrangular shape.

Coils C5 and C6 are independently wound around leg portions 26 and 27, respectively. The first electrode of coil C5 is connected to first terminal 21a, the second electrode of coil C5 is connected to the first electrode of coil C6, and the second electrode of coil C6 is connected to second terminal 21b. In other words, coils C5 and C6 are connected in series between first terminal 21a and second terminal 21b to form one coil. Each of reactors 22 to 24 is identical in configuration to reactor 21.

Accordingly, in the comparative example, four reactors 21 to 24 are provided for four choppers 11 to 14, respectively, which causes a problem that a device is increased in size and cost. On the other hand, since one reactor 1 is provided for four choppers 11 to 14 in the first embodiment, so that a device can be decreased in size and cost.

Second Embodiment

Figure 8:
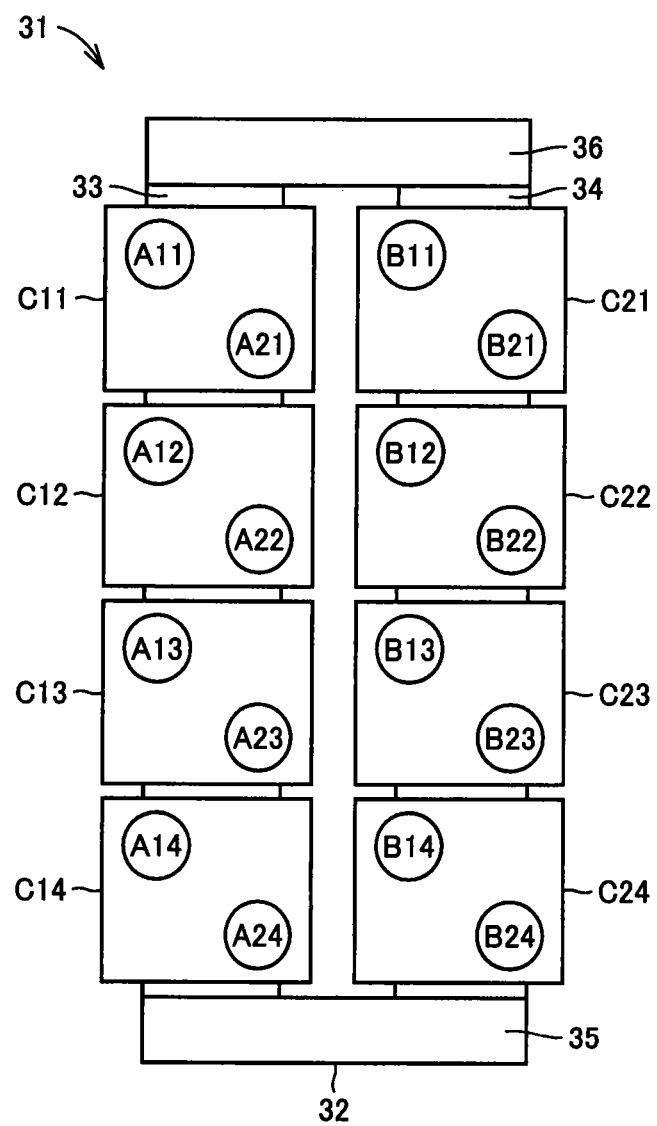
FIG. 8 is a diagram showing a main part of a reactor according to the second embodiment of the present invention.

A reactor 31 according to the second embodiment of the present application includes an annular iron core 32 in a quadrangular shape, and a plurality of (eight in FIG. 8) coils C11 to C14 and C21 to C24 as shown in FIG. 8. Iron core 32 includes two leg portions 33 and 34, and two yoke portions 35 and 36. Two leg portions 33 and 34 are provided at a prescribed distance from and in parallel to each other, and vertically arranged on yoke portion 35. Leg portions 33 and 34 each have a lower end joined to yoke portion 35, and an upper end to which yoke portion 36 is joined. Leg portions 33 and 34 are magnetically coupled by yoke portions 35 and 36. Leg portions 33, 34 and yoke portions 35, 36 form an annular magnetic path in a quadrangular shape.

Coils C11 to C14 are sequentially arranged in the top-to-bottom direction of leg portion 33. Coils C11 to C14 are separately wound around leg portion 33. Coils C11 to C14 are the same components, each of which is formed by winding the same conductive wire in the same winding direction (for example, in the rightward winding direction) by the same number of winding times. As seen from above leg portion 33, each of coils C11 to C14 is wound in a prescribed winding direction (for example, in the rightward winding direction). Coils C11 to C14 are provided at their starting ends with first electrodes A11 to A14, respectively, and at their terminal ends with second electrodes A21 to A24.

Similarly, coils C21 to C24 are sequentially arranged in the top-to-bottom direction of leg portion 34. Coils C21 to C24 are separately wound around leg portion 34. Coils C21 to C24 are the same components, each of which is formed by winding the same conductive wire in the same winding direction (for example, in the rightward winding direction) by the same number of winding times. As seen from above leg portion 34, each of coils C21 to C24 is wound in a prescribed winding direction (for example, in the rightward winding direction). Coils C21 to C24 are provided at their starting ends with first electrodes B11 to B14, respectively, and at their terminal ends with second electrodes B21 to B24.

Each pair of coils C11 and C21, coils C12 and C22, coils C13 and C23, and coils C14 and C24 are arranged adjacent to each other. In this reactor 31, the degrees of electromagnetic coupling between coils C11 to C14 and C21 to C24, respectively, are relatively low, thereby causing an increase in a leakage inductance.

Figure 9:
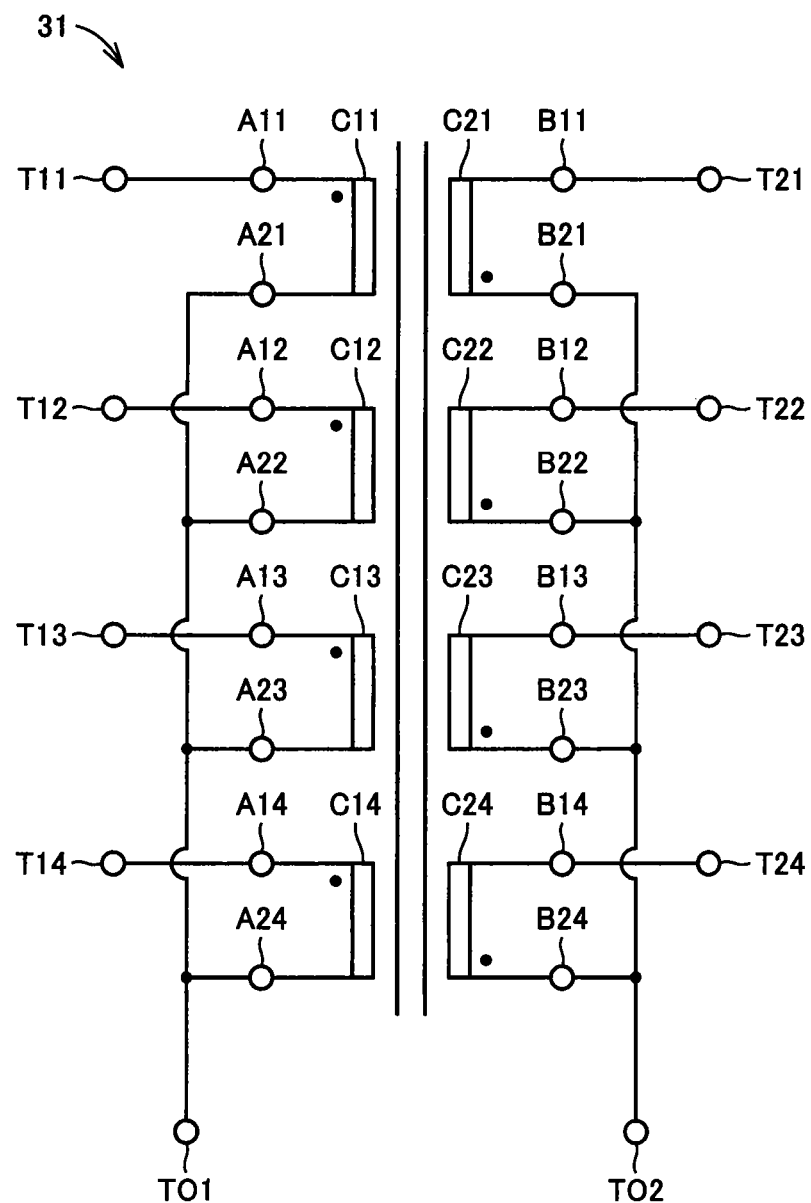
FIG. 9 is a circuit diagram showing the configuration of the reactor shown in FIG. 8.

FIG. 9 is a circuit diagram showing the configuration of reactor 31. In FIG. 9, reactor 31 includes eight input terminals T11 to T14 and T21 to T24, and two output terminals TO1 and TO2, in addition to iron core 32 and coils C11 to C14 and C21 to C24. First electrodes A11 to A14 of coils C11 to C14 are connected to input terminals T11 to T14, respectively, while second electrodes A21 to A24 each are connected to output terminal TO1. First electrodes B11 to B14 of coils C21 to C24 are connected to input terminals T21 to T24, respectively, while second electrodes B21 to B24 each are connected to output terminal TO2.

Since the starting ends (first electrodes A11 to A14) of coils C11 to C14 and the terminal ends (second electrodes B21 to B24) of coils C21 to C24 have the same polarity, the starting ends of coils C11 to C14 and the terminal ends of coils C21 to C24 each are indicated by a black dot mark in FIG. 9. Each pair of coils C11 and C21, coils C12 and C22, coils C13 and C23, and coils C14 and C24 forms a normal mode coil.

Figure 10:
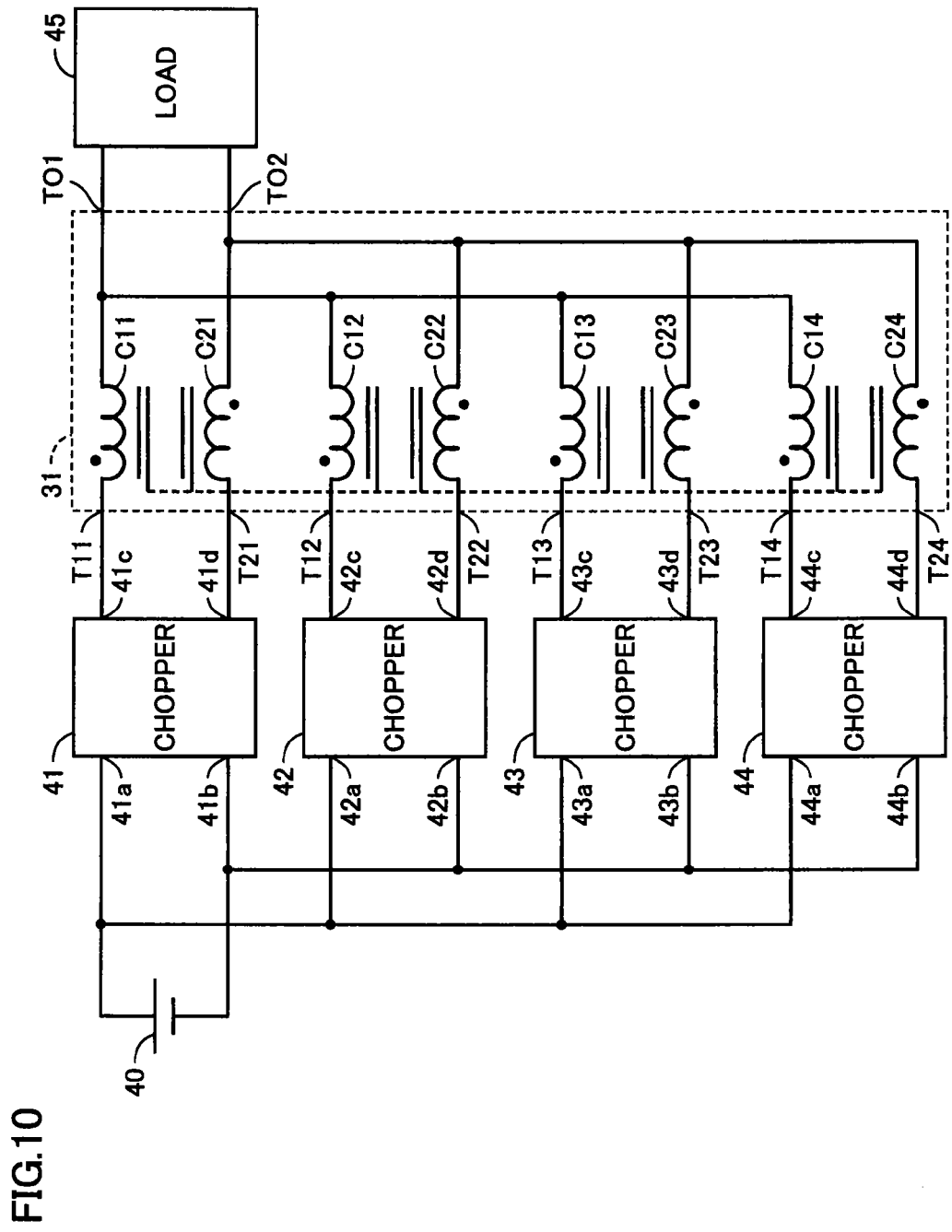
FIG. 10 is a circuit block diagram showing the configuration of a power supply device employing the reactor shown in FIG. 9.

FIG. 10 is a circuit block diagram showing the configuration of a power supply device including reactor 31. In FIG. 10, the power supply device includes a DC power supply 40, four choppers 41 to 44, and reactor 31. Power supply terminals 41a to 44a of choppers 41 to 44 each are connected to the positive electrode of DC power supply 40. Reference voltage terminals 41b to 44b of choppers 41 to 44 each are connected to the negative electrode of DC power supply 40.

First output terminals 41c to 44c of choppers 41 to 44 are connected to input terminals T11 to T14, respectively, of reactor 31. Second output terminals 41d to 44d of choppers 41 to 44 are connected to input terminals T21 to T24, respectively, of reactor 31. Output terminal TO1 of reactor 31 is connected to one terminal of load 45. Output terminal TO2 of reactor 31 is connected to the other terminal of load 45. The negative electrode of DC power supply 40 receives a reference voltage (for example, a ground voltage).

Each of choppers 41 to 44 receives a DC voltage V1 from DC power supply 40, converts DC voltage V1 into a prescribed DC voltage V2, and supplies the converted DC voltage to load 45. Choppers 41 to 44 are controlled such that the current flowing through load 45 is equally shared among choppers 41 to 44.

Figure 11:
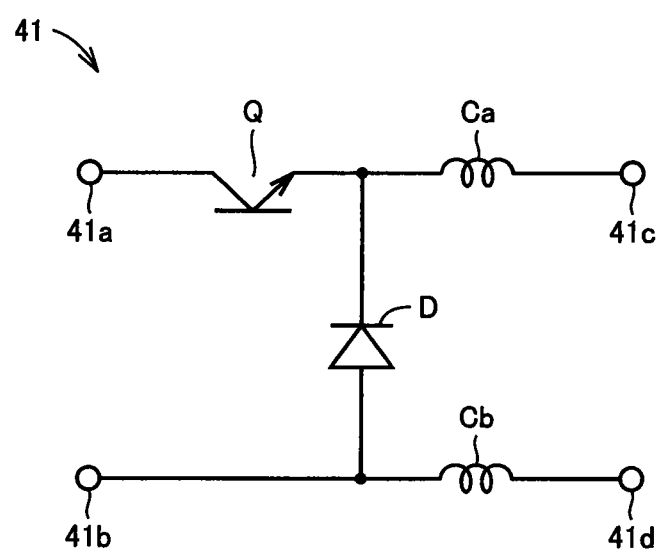
FIG. 11 is a circuit diagram showing the configuration of a chopper shown in FIG. 10.

FIG. 11 is a circuit diagram showing the configuration of chopper 41. In FIG. 11, chopper 41 includes a transistor Q, a diode D, and coils Ca and Cb. Transistor Q has a collector connected to input terminal 41a, and an emitter connected to first output terminal 41c through coil Ca. Diode D has an anode connected to a reference voltage terminal 41b, and a cathode connected to the emitter of transistor Q. Coil Cb is connected between reference voltage terminal 41b and second output terminal 41d.

When transistor Q is turned on, a current flows from the positive electrode of DC power supply 10 through transistor Q, coils Ca and C11, load 45, and coils C21 and Cb into the negative electrode of DC power supply 40, and electromagnetic energy is stored in coils Ca, Cb, C11, and C21. When transistor Q is turned off, a current flows into the path of coils Ca and C11, load 45, coils C21 and Cb, and diode D by means of electromagnetic energy stored in coils Ca, Cb, C11, and C21.

Transistor Q is turned on and off in a prescribed cycle. If the ON time of transistor Q in one cycle is increased, voltage V2 to be applied to load 45 rises. In contrast, if the ON time of transistor Q in one cycle is decreased, voltage V2 to be applied to load 45 falls. Therefore, by adjusting the ON time of transistor Q, output voltage V1 of DC power supply 40 can be converted into a desired DC voltage V2, which then can be supplied to load 45.

Each of other choppers 42 to 44 is also identical in configuration to chopper 41. By finely adjusting the ON times of transistors Q of choppers 41 to 44 separately, the load current can be equally shared among choppers 41 to 44.

In this second embodiment, a plurality of coils C11 to C14 and C21 to C24 are separately wound around iron core 32, and these plurality of coils C11 to C14 and C21 to C24 are employed to form a plurality of normal mode coils. Accordingly, a plurality of choppers 41 to 44 can be connected in parallel to load 45 by one reactor 31, so that a device can be decreased in size and cost.

In addition, although each of choppers 41 to 44 is configured to include coils Ca and Cb in this second embodiment, coils Ca and Cb may be omitted. In this case, coils C11 to C14 additionally serve as coils Ca of choppers 41 to 44, respectively, while coils C21 to C24 additionally serve as coils Cb of choppers 41 to 44, respectively.

Furthermore, although DC power supply 40 and choppers 41 to 44 are provided in this second embodiment, the configuration is not limited thereto, but each of choppers 41 to 44 may be replaced with an inverter converting a DC voltage into an AC voltage. Furthermore, DC power supply 40 may be replaced with an AC power supply, and each of choppers 41 to 44 may be replaced with a converter converting an AC voltage into a DC voltage.

Furthermore, three reactors 31 corresponding to three phases, respectively, may be employed, and a plurality of inverters may be connected in parallel for each phase by reactor 31.

Furthermore, although four pairs of coils C11 to C14 and C21 to C24, respectively, are wound around one iron core 32 in this second embodiment, two pairs, three pairs or five or more pairs of coils may be wound around one iron core while two, three or five or more choppers may be connected in parallel to load 45. In other words, N (N is an integer of 2 or more) pairs of coils may be wound around one iron core while N choppers may be connected in parallel to load 45.

Figure 12:
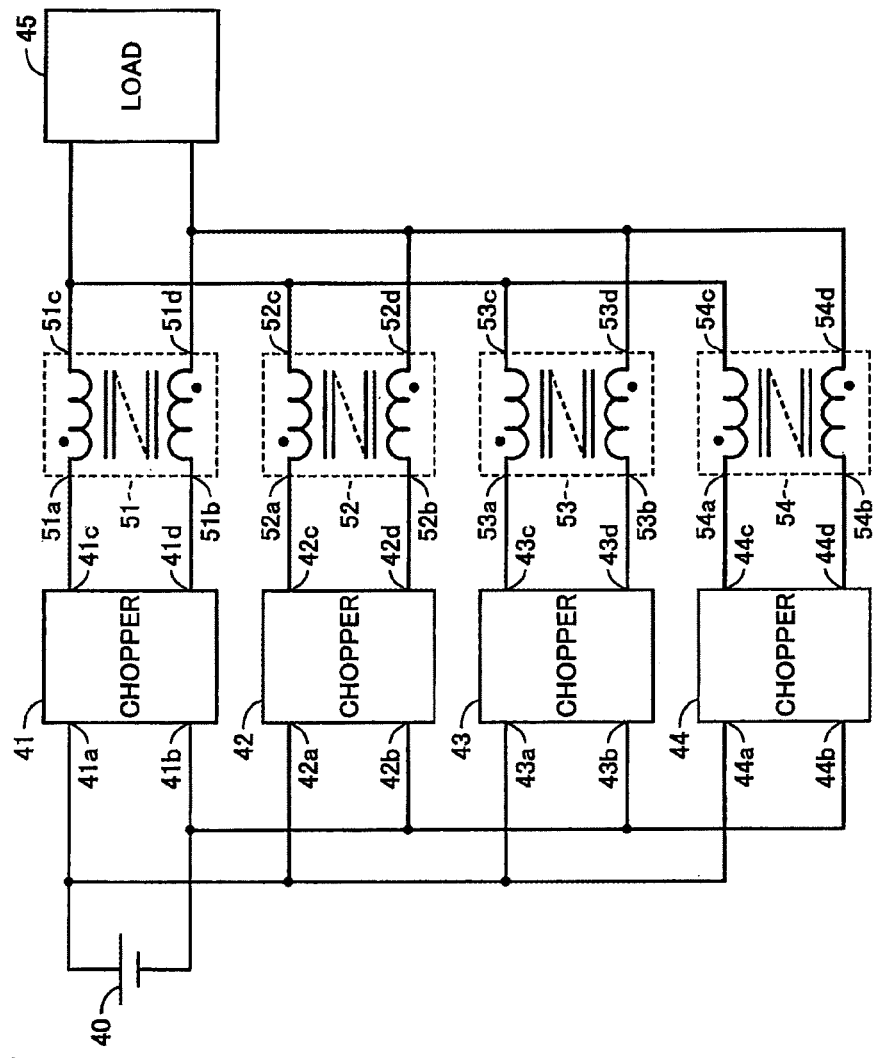
FIG. 12 is a circuit block diagram showing the configuration of a power supply device as a comparative example of the second embodiment.

FIG. 12 is a circuit block diagram showing the configuration of a power supply device as a comparative example of the second embodiment, which is a diagram compared with FIG. 10. Referring to FIG. 12, the difference between this power supply device and the power supply device in FIG. 12 is that reactor 31 is replaced with four normal mode reactors 51 to 54.

First terminals 51a to 54a of reactors 51 to 54 are connected to first output terminals 41c to 44c of choppers 41 to 44, respectively. Second terminals 51b to 54b of reactors 51 to 54 are connected to second output terminals 41d to 44d of choppers 41 to 44, respectively. Third terminals 41c to 44c of reactors 41 to 44 each are connected to one terminal of load 45. Fourth terminals 41d to 44d of reactors 41 to 44 each are connected to the other terminal of load 45.

Figure 13:
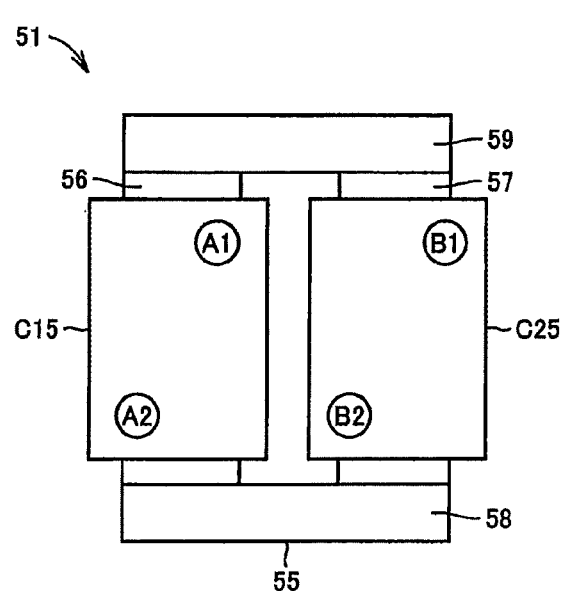
FIG. 13 is a diagram showing the configuration of a reactor shown in FIG. 12.
Figure 14:
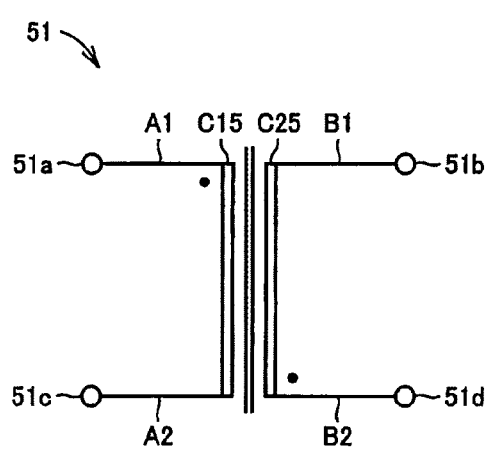
FIG. 14 is a circuit diagram showing the reactor shown in FIG. 13.

FIG. 13 is a diagram showing a main part of a reactor 51. FIG. 14 is a circuit diagram showing reactor 51. In FIGS. 13 and 14, reactor 51 includes an annular iron core 55 in a quadrangular shape, two coils C15 and C25, and first to fourth terminals 51a to 51d. Iron core 55 includes two leg portions 56 and 57, and two yoke portions 58 and 59. Leg portions 56 and 57 are magnetically coupled by yoke portions 58 and 59. Leg portions 56, 57 and yoke portions 58, 59 form an annular magnetic path in a quadrangular shape.

Coils C15 and C25 are independently wound around leg portions 56 and 57, respectively. A first electrode A1 of coil C15 is connected to a first terminal 51a while a second electrode A2 of coil C15 is connected to a third terminal 51c. A first electrode B1 of coil C25 is connected to a second terminal 51b while second electrode B2 of coil C25 is connected to a fourth terminal 51d. Coils C15 and C25 form a normal mode coil. Each of reactors 52 to 54 is identical in configuration to reactor 51.

Accordingly, in the comparative example, four reactors 51 to 54 are provided for four choppers 41 to 44, respectively, which causes a problem that a device is increased in size and cost. On the other hand, one reactor 31 is provided for four choppers 41 to 44 in the second embodiment, so that a device can be decreased in size and cost.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1, 21 to 24, 31, 51 to 54 reactor, 2, 25, 32, 55 iron core, 3, 4, 26, 27, 33, 34, 56, 57 leg portion, 5, 6, 28, 29, 35, 36, 58, 59 yoke portion, 10, 40 DC power supply, 11 to 14, 41 to 44 chopper, 15, 45 load, A, B electrode, C coil, D diode, Q transistor, T terminal.

The invention claimed is:
1. A power supply device comprising:
N (N is an integer of 2 or more) power supplies; and
a reactor by which said N power supplies are connected in parallel to a load,
said reactor including:
an annular iron core; and
N coils separately wound around said iron core, said N coils having first electrodes connected to output terminals of said N power supplies, respectively, and second electrodes each connected to said load, said N coils being sequentially arranged in a circumferential direction of said iron core, said N coils being wound from the first electrodes to the second electrodes in the same winding direction, currents flowing from said N power supplies to said load through said N coils to generate magnetic fluxes in the same direction in said iron core by said N coils.

2. The power supply device according to claim 1, wherein said reactor further includes:

N first terminals connected to the first electrodes of said N coils, respectively; and a second terminal connected to the second electrodes of said N coils, said N first terminals are connected to the output terminals of said N power supplies, respectively, and said second terminal is connected to said load.

3. The power supply device according to claim 1, wherein each of said N power supplies is a chopper converting a first DC voltage into a second DC voltage.

4. The power supply device according to claim 1, wherein each of said N power supplies is an inverter converting a DC voltage into an AC voltage.

5. The power supply device according to claim 1, wherein each of said N power supplies is a converter converting an AC voltage into a DC voltage.

6. A power supply device comprising:

N (N is an integer of 2 or more) power supplies; and a reactor by which said N power supplies are connected in parallel to a load, said reactor including:

an annular iron core; and

N first coils and N second coils separately wound around said iron core, said N first coils having first electrodes connected to first output terminals of said N power supplies, respectively, and second electrodes each connected to one terminal of said load, said N second coils having first electrodes connected to second output terminals of said N power supplies, respectively, and second electrodes each connected to the other terminal of said load, said N first coils being sequentially arranged in a circumferential direction of said iron core, said N first coils being wound from the first electrodes of said N first coils to the second electrodes of said N first coils in the same winding direction, said N second coils being sequentially arranged in a circumferential direction of said iron core, said N second coils being wound from the first electrodes of said N second coils to the second electrodes of said N second coils in the same winding direction, currents flowing from said N power supplies to said load through said N first coils and said N second coils to generate magnetic fluxes in the same direction in said iron core by said N first coils and to generate magnetic fluxes in the same direction in said iron core by said N second coils, starting ends of said N first coils and terminal ends of said N second coils having the same polarity.

7. The power supply device according to claim 6, wherein each of said N power supplies is a chopper converting a first DC voltage into a second DC voltage.

8. The power supply device according to claim 6, wherein each of said N power supplies is an inverter converting a DC voltage into an AC voltage.

9. The power supply device according to claim 6, wherein each of said N power supplies is a converter converting an AC voltage into a DC voltage.

10. A reactor by which N (N is an integer of 2 or more) power supplies are connected in parallel to a load, said reactor comprising:

an annular iron core;

N first coils and N second coils separately wound around said iron core;

N first terminals connected to the first electrodes of said N first coils, respectively;

N second terminals connected to the first electrodes of said N second coils, respectively;

a third terminal connected to the second electrodes of said N first coils; and a fourth terminal connected to the second electrodes of said N second coils, said N first terminals being connected to the first output terminals of said N power supplies, respectively, said N second terminals being connected to the second output terminals of said N power supplies, respectively, said third terminal being connected to one terminal of said load, starting ends of said N first coils and terminal ends of said N second coils having the same polarity, said fourth terminal being connected to the other terminal of said load.

11. A power supply device comprising:

the reactor according to claim 10, and said N power supplies.

12. The power supply device according to claim 11, wherein each of said N power supplies is a chopper converting a first DC voltage into a second DC voltage.

13. The power supply device according to claim 11, wherein each of said N power supplies is an inverter converting a DC voltage into an AC voltage.

14. The power supply device according to claim 11, wherein each of said N power supplies is a converter converting an AC voltage into a DC voltage.

15. A reactor by which N (N is an integer of 2 or more) power supplies are connected in parallel to a load, said reactor comprising:

an annular iron core; and

N first coils and N second coils separately wound around said iron core;

said N first coils having first electrodes connected to first output terminals of said N power supplies, respectively, and second electrodes each connected to one terminal of said load, said N second coils having first electrodes connected to second output terminals of said N power supplies, respectively, and second electrodes each connected to the other terminal of said load, starting ends of said N first coils and terminal ends of said N second coils having the same polarity, said iron core including first and second leg portions, and a yoke portion magnetically coupling the first and second leg portions, said N first coils being separately wound around said first leg portion, said N second coils being separately wound around said second leg portion, and said first coil and said second coil connected to the same power supply being arranged adjacent to each other.

16. A power supply device comprising:
the reactor according to claim 15, and
said N power supplies.

17. The power supply device according to claim 16, wherein each of N power supplies is a chopper converting a first DC voltage into a second DC voltage.

18. The power supply device according to claim 16, wherein each of said N power supplies is an inverter converting a DC voltage into an AC voltage.

19. The power supply device according to claim 16, wherein each of said N power supplies is a converter converting an AC voltage into a DC voltage.

* * * * *